United States Patent Office 3,072,700
Patented Jan. 8, 1963

3,072,700
PROCESS FOR PRODUCING SILANES
Nicolaas P. M. de Wit, Kenmore, N.Y., assignor to Union Carbide Corporation, a corporation of New York
No Drawing. Filed July 29, 1960, Ser. No. 46,097
Claims priority, application Netherlands Aug. 7, 1959
11 Claims. (Cl. 260—448.8)

This invention relates to the preparation of silanes of the formulas $(RO)_3SiH$ and $(RO)_2SiH_2$ by the reaction of at least one alcohol, ROH, with silicon particles in a fluidized bed.

The compounds produced by the process of the present invention may be represented by the formula:

$$(RO)_{4-b}SiH_b$$

wherein R is a monovalent hydrocarbon group free of aliphatic unsaturation, a halogen-substituted monovalent hydrocarbon group free of aliphatic unsaturation or a group represented by the formula $C_rH_{2r+1}(OC_mH_{2m})_n$, where $r$, $m$ and $n$ are integers having values from 1 to about 6, and $b$ is an integer having a value from 1 to 2. For example, R can be methyl, ethyl, gamma-trichloropropyl, trifluoromethyl, isopropyl, n-hexyl, n-dodecyl, cyclopentyl, cyclohexyl, phenyl, naphthyl, p-chlorobenzyl, m-bromophenyl, beta-phenylethyl, mesityl, n-butylphenyl, p-iodomethylphenyl, $CH_3OCH_2CH_2$
$CH_3CH(CH_3)CH_2OCH_2CH_2CH_2$
$CH_3CH_2OCH_2CH_2OCH_2CH_2$
$CH_3CH_2CH_2H_2CH_3CH_3OCH_2CH_2OCH_2CH_2OCH_2CH_2$ and $CH_3OCH_2CH_2CH(CH_3)CH_2CH_2$ Preferably, R is an alkyl group containing from one to about six carbon atoms or a phenyl group.

It is known to prepare trialkoxysilanes of the formula $(RO)_3SiH$, for example, trimethoxysilane, by causing the reaction of silicochloroform, $SiHcl_3$, with an alcohol, ROH. The silicochloroform required for this reaction can be obtained, along with greater or smaller quantities of tetrachlorosilane, by the reaction of silicon with hydrochloric acid at about 300° C. In the reaction of silicochloroform and the alcohol, tetraalkysilicate and various polycondensation products are always formed to a considerable extent, along with trialkoxysilanes.

Diethoxysilane is prepared in the same way by reaction of dichlorosilane ($SiH_2Cl_2$) with ethanol. The dichlorosilane can be obtained at temperature of about 350° C. with low efficiency along with other silanes ($SiH_4$, $SiH_3Cl$ and $SiCl_4$) by the reduction of silicochloroform with hydrogen in the presence of aluminum or zinc. These metals act not only as catalysts, but also chiefly as halogen-accepters.

The above-mentioned reactions required for the preparation of alkoxysilanes with one or more Si—H-bonds are subject to several disadvantages, one of the most important of which is the liberation of hydrochloric acid as a product of reaction so that corrosion of the instruments and vessels used may occur. Moreover, the chlorosilanes themselves are easily hydrolyzed during which the corrosive hydrochloric acid is formed as well. Further with these reactions the chlorosilane used as a raw material contains only a relatively low percentage of silicon and is generally rather expensive, so that the cost of the products obtained becomes high.

It is further known to prepare tetramethylsilicate in accordance with the reaction:

$$4CH_3OH + Si \rightarrow (CH_3O)_4Si + 2H_2$$

This conversion has been described, for example, in United States Patent No. 2,473,260 and occurs, according to this patent, in a fixed bed. However, it has been proposed also, namely, in United States Patent No. 2,389,931, to carry out the reaction in a fluidized contact mass. This latter patent mainly concerns the reaction of alkylhalides with silicon, by which alkylhalosilanes are formed, but it also mentions the reaction of methanol with silicon in a fluidized bed to produce tetramethylsilicate.

According to the present invention, silane derivatives of the general formulas $(RO)_3SiH$ and $(RO)_2SiH_2$, in which R has the meaning defined hereinabove, can be prepared by passing vapors of at least one alcohol, ROH, wherein R has the meaning defined hereinabove, through finely-divided silicon in a fluidized state and containing a catalyst at temperatures of 100° C. to 450° C., preferably 200° C. to 350° C., and isolating the compounds $(RO)_3SiH$ and/or $(RO)_2SiH_2$ from the products of reaction formed.

The invention is of importance in the formation of trimethoxysilane and dimethoxysilane and therefore will be further illustrated on the basis of this embodiment.

It has been determined, that dependent on the reaction conditions, along with the tetramethylsilicate, relatively large quantities of trimethoxysilane and dimethoxysilane are formed, which can be separated from the tetramethylsilicate simultaneously formed, and that the reaction can be directed in such a way that mainly trimethoxysilane and/or dimethoxy silane are formed.

When methanol in the vapor state is passed through a fixed bed of finely-divided silicon, practically only tetramethylsilicate is formed. Just as for the other above-mentioned reactions, a contact mass is used for this reaction which contains, along with the silicon, copper as a catalyst.

With the reaction of silicon and methanol, however, the following relatively strongly exothermic reaction occurs also:

$$Si + CH_3OH \rightarrow SiO_2 + C, H_2, CH_4$$

and other hydrocarbons.

This reaction, which involves a loss of raw materials and therefore is very undesirable, is favored by using a high temperature of reaction. In a fixed bed in which high temperatures may occur locally, it is inevitable that temperature peaks are promoted. This is particularly true because this side reaction is very exothermic in comparison to the reaction desired.

When the reaction occurs in a fluidized bed, a better equalization of temperature is possible than in a fixed bed because of the good longitudinal mixing of the fluidized solid phase, so that the above-mentioned undesirable side reaction is counteracted. The efficiency of the conversion of the methanol to methoxysilanes is considerably improved in this way. In a fluidized bed, temperature peaks may nevertheless be present which cause local occurrences of the side reaction. This can be avoided or at least diminished by diluting the methanol or other alcohol vapor with a carrier gas, and a preferred embodiment of this invention employs a carrier gas for the vapors of alcohol and/or phenol. The carrier gas should be subtantially non-reactive with the reaction vessel, the components of the fluidized bed, the reactant vapors and the silane products. An exception is hydrogen which can react with one of the silane products as discussed below with reference to Equation 2. Suitable carrier gases are argon, nitrogen, helium, neon, hydrogen and the like.

The formation of tetramethylsilicate can also be suppressed by several other means which are discussed below.

Three reactions, which deserve consideration here, occur as follows:

(1) $4CH_3OH + Si \rightarrow (CH_3O)_4Si + 2H_2$
(2) $3CH_3OH + Si \rightarrow (CH_3O)_3SiH + H_2$
(3) $2CH_3OH + Si \rightarrow (CH_3O)_2SiH_2$ With the reactions (1) and (2) hydrogen is formed. If the gases formed with the reaction are recirculated, or if hydrogen is used as the carrier gas, so in other words hydrogen is added along with the methanol, reaction (1) will be counteracted; reactions (2) and (3) on the other hand will occur to a higher extent; the last reaction (3) will occur to a still higher extent as more hydrogen is added and reaction (2) is counteracted to some degree. Thus, hydrogen is a preferred carrier gas in the process of this invention.

The temperature too is of importance. At 345° C., for example, reaction (2) will predominate; the temperature being lowered to about 250° C., reaction (3) will become more significant. In addition, the side reaction which causes formation of $SiO_2$ and cracked gases is counteracted. For this purpose the above-mentioned recirculation of the hydrogen formed is also useful.

In order to obtain a good equalization of temperature, it is advantageous to work with a degree of fluidization (defined as the ratio of the gas velocity in the fluidized bed to the minimum gas velocity required for fluidization) greater than about 5. The optimum degree of fluidization varies depending on the dimensions of the bed and the reaction temperature, but degrees of fluidization in the range of about 5 to about 20 have proved satisfactory in the process of this invention.

It is of importance to use a contact mass in which the copper is deposited in finely-divided form on the particles of silicon. The silicon will react with the methanol vapor and will, therefore gradually be volatilized. The particles of copper in the contact mass, if they are finely divided, will be carried along with the gaseous products of reaction. However, coarser particles of copper, if any, will remain behind, melt together and collect in the lower part of the fluidized bed. This is very undesirable as this copper abstracts hydrogen from the added methanol vapor, so that carbon monoxide, formaldehyde and other undesirable products of reaction are formed. If the copper is finely divided, the percentage of copper of the contact mass will remain practically the same, liberated particles of copper being carried away by the gas stream.

The term "finely divided" as used herein means a maximum dimension for the individual particle of less than about 50 microns and preferably less than about 10 microns.

Uniform consumption of silicon in all particles is out of the question if the process takes place in a fixed bed. At the place where the reaction occurs with the highest partial pressure, near the inlet, the percentage of copper will increase rapidly. Partly owing to this accumulation of copper in the fixed bed, this method of operating is much less advantageous than the fluidized bed.

Finally, the amount of zinc or other promotor employed is of importance. In the known methods of operation, an amount of, for example, one or two percent was employed. With the procedure according to the present invention, much smaller amounts of only 0.01 to 0.5 weight percent are required. This appears to direct the reaction towards the formation of $(RO)_3SiH$ and $(RO)_2SiH_2$. In addition, a contact mass containing relatively large amounts of zinc is less easily fluidized, and fluidization with formation of canals may easily occur.

The contact mass can be prepared in the conventional way. A suitable starting material for the copper catalyst is, for example, cuprous chloride. This is mixed with the finely-divided silicon and the mixture is heated in a nitrogenous atmosphere. The cuprous chloride is thereby reduced by the silicon according to the following reaction:

$$Si + 4CuCl \rightarrow SiCl_4 + Cu$$

The copper, which occurs intermediately in atomic form, is very reactive and settles in finely-divided form on the silicon.

The zinc can be added as such or, for example, in the form of zinc halides.

For the preparation of a contact mass containing, for example, 10 weight percent copper and 0.1 weight percent zinc, which is very suitable for the process of this invention, one can proceed as follows:

A mixture of powdered cuprous chloride and zinc powder is mixed with silicon particles of the following composition:

| | Percent |
|---|---|
| 50–75 microns | 20 |
| 75–105 microns | 24 |
| 105–125 microns | 16 |
| 125–175 microns | 40 |

The resultant mixture is put in the reactor and heated to 300° C. to 350° C. while a slow stream of nitrogen is passed through the mixture.

Instead of pure silicon, ferrosilicon or other silicon alloys can also be used. In addition to zinc, other promotors such as aluminum and iron may be used in the process of this invention.

When pure silicon is used, the fluidized bed may contain from 98 weight percent to 70 weight percent silicon particles depending on the copper content, from 2 weight percent to 30 weight percent copper, and from 0.01 weight percent to 0.5 weight percent promotor. A preferred fluidized bed contains about 90 weight percent silicon, about 10 weight percent copper and about 0.1 weight percent zinc.

The fluidized bed reactors and product recovery systems employed in the process of this invention are those conventionally used in reactions involving fluidized contact masses.

A typical reactor comprises a tube (length 120 cm.; surface cross-section 15.9 square cm.), which has a porous inlet plate for alcohol vapor and carrier gas at the bottom and opens out at the top into an expansion space in which the dust can settle. Over the porous plate is the fluidized bed, which is electrically heated in three parts. The added alcohol vapor or carrier gas is preheated to the temperature required for the reaction just under the inlet plate. In the fluidized bed itself the temperature is measured by means of thermocouples placed at different heights.

The gas mixture leaving the reactor passes together with some dust which has been carried along, through the expansion space towards a condenser, such as a Vigreux column, the column being cooled down to as low as −80° C. at the top. This low temperature is required to condense the products (normally liquid at room temperature) because the product gas stream travels at relatively high velocity and is often diluted with a very low boiling carrier gas. In this column the dust is precipitated from the gas mixture and is removed together with the fluid reaction products. The dust particles are removed from the liquid reaction products by filtration and the dimethoxysilane and trimethoxysilane, which have boiling points of 34° C. and 83.5° C., respectively, are recovered from the fluid products by conventional methods such as fractional distillation.

The results of several experiments are shown in the following table. In none of these experiments was there any apparent decrease in the activity of the contact mass during the period of reaction. However, the production of the tetramethylsilicate decreased in contrast with the production of products with one or more Si—H-bonds.

*Test Results*

| Duration of the test (hours) | 5 | 7 | 8 | 8 |
|---|---|---|---|---|
| Temperature of reaction (° C.) | 325 | 345 | 325 | 275 |
| Initial weight of the contact mass (grams) | 880 | 880 | 880 | 880 |
| Composition of the contact mass: | | | | |
| Percent Si | 90 | 90 | 90 | 90 |
| Percent Cu | 10 | 10 | 10 | 10 |
| Percent Zn | 0.1 | 0.1 | 0.1 | 0.1 |
| Rate of introduction of CH₃OH (gram/hour) | 220 | 110 | 110 | 110 |
| Rate of introduction of hydrogen (liters/hour) | | 75 | 75 | 75 |
| Composition of the reaction products: | | | | |
| Percent (CH₃O)₂SiH₂, B.P. 34° C | 2 | 5 | 14 | 28 |
| Percent (CH₃O)₃SiH, B.P. 83.5° C | 45 | 78 | 68 | 45 |
| Percent (CH₃O)₄Si, B.P. 121° C | 42 | 10 | 6 | 3 |
| Percent Residue | 8 | | | |
| Percent Unconverted methanol | 3 | 7 | 12 | 24 |

In a further example, a charge of 1775 grams of contact mass comprising 1590 grams of silicon particles, about 10 weight percent copper and about 0.1 weight percent zinc, was placed in a vertical tube reactor 29.2 square centimeters in cross-sectional area and was fluidized by passing through the contact mass a mixture comprising equal volumes of ethanol vapor and hydrogen gas. The temperature was maintained at 280° C. and 1403 grams of ethanol was introduced into the fluidized bed over a four-hour period. The reaction products leaving the fluidized bed were recovered by condensing the effluent first at 10° C. in a water condenser and then at −80° C. in a condenser cooled with Dry Ice. The dust-liquid mixture from the two condensers were combined, filtered and the liquid products separated by fractional distillation. The liquid product weighed 1590 grams and contained about 87 weight percent triethoxysilane. The residual contact mass weighed 1416 grams and contained about 10.8 weight percent copper, 0.3 weight percent carbon and 2.5 weight percent silicon dioxide.

The compounds produced by the process of this invention, such as trimethoxysilane and dimethoxysilane, are important starting materials for the formation of other organic silicon compounds, in particular for the preparation of technically important silicones. These materials have properties similar to SiHCl₃ and SiH₂Cl₂ as far as the Si—H-bond is concerned and can be used as raw materials for reactions of addition and "silanation", in order to obtain intermediary compounds for silicone products.

The invention has been illustrated on the basis of the preparation of methoxysilanes and ethoxysilanes, but in the same way it can be applied to the preparation of, for example, the corresponding tertiary-butoxy-, n-hexoxy-, n-dodecoxy-, phenoxy-, gamma-trichloropropoxy-, trifluoromethoxy-, beta-phenylethoxy-, p-chlorobenzoxy-, mesitoxy-, beta-methoxyethoxy-, gamma-isobutoxypropoxy-silanes, and the like.

Similarly, silanes with RO groups differeing among each other can be formed by starting from a mixture of two or more alcohols and/or phenols, for example, mixtures of ethanol and methanol; of methanol and phenol; of butanol and cresol; of methanol, ethanol and phenol; of gamma-trichloropropanol and p-bromophenol; and of cyclopentanol and ethylene glycol monomethyl ether. A preferred alcohol mixture, because of the relatively high rate of reaction and good yield of mixed alkoxysilanes, is a mixture of methanol and n-butanol.

What is claimed is:

1. A process for the production of compounds represented by the formula:

$$(RO)_{4-b}SiH_b$$

wherein R is selected from the class consisting of monovalent hydrocarbon groups free of aliphatic unsaturation, halogen-substituted monovalent hydrocarbon groups free of aliphatic unsaturation and groups represented by the formula $CrH_{2r+1}(OC_mH_{2m})_n$, where $r$, $m$ and $n$ are integers having values from 1 to about 6, and $b$ is an integer having a value from 1 to 2, which process comprises passing vapors of at least one alcohol having the formula ROH, wherein R has the meaning defined hereinabove, through a fluidized bed of silicon particles at a temperature between about 100° C. and 450° C. and with a degree of fluidization greater than about 5, said fluidized bed consisting essentially of about 98 to 70 weight percent silicon particles, about 2 to 30 weight percent finely-divided copper and about 0.01 to 0.5 weight percent of a promotor selected from the class consisting of zinc, aluminum and iron.

2. A process for the production of compounds represented by the formula:

$$(RO)_{4-b}SiH_b$$

wherein R is an alkyl group containing from one to about six carbon atoms and $b$ is an integer having a value from 1 to 2, which process comprises passing vapors of at least one alcohol having the formula ROH, wherein R has the meaning defined hereinabove, through a fluidized bed of silicon particles at a temperature between about 100° C. and 450° C. and with a degree of fluidization greater than about 5, said fluidized bed consisting essentially of about 98 to 70 weight percent silicon particles, about 2 to 30 weight percent finely-divided copper and about 0.01 to 0.5 weight percent of a promotor selected from the class consisting of zinc, aluminum and iron.

3. A process for the production of compounds represented by the formula:

$$(RO)_{4-b}SiH_b$$

wherein R is an alkyl group containing from one to about six carbon atoms and $b$ is an integer having a value from 1 to 2, which process comprises passing a mixture of a carrier gas selected from the class consisting of argon, helium, neon, nitrogen and hydrogen and vapors of at least one alcohol having the formula ROH, wherein R has the meaning defined hereinabove, through a fluidized bed of silicon particles at a temperature between about 100° C. and 450° C. and with a degree of fluidization greater than about 5, said fluidized bed consisting essentially of about 98 to 70 weight percent silicon particles, about 2 to 30 weight percent finely-divided copper and about 0.01 to 0.5 weight percent of a promotor selected from the class consisting of zinc, aluminum and iron.

4. Process in accordance with claim 3 wherein said temperature is between 200° C. and 350° C.

5. Process in accordance with claim 3 wherein the degree of fluidization of said fluidized bed is between about 5 and about 20.

6. Process in accordance with claim 3 wherein R is methyl and said alcohol is methanol.

7. Process in accordance with claim 3 wherein R is ethyl and said alcohol is ethanol.

8. Process in accordance with claim 1 wherein R is phenyl and said alcohol is phenol.

9. Process in accordance with claim 3 wherein R is methyl and n-butyl and said alcohol is a mixture of methanol and n-butanol.

10. A process for the production of dimethoxysilane and trimethoxysilane which comprises passing a mixture of hydrogen gas and methanol vapor through a fluidized bed of silicon particles at a temperature between about 275° C. and about 345° C. and with a degree of fluidization between about 5 and about 20, said fluidized bed consisting essentially of about 90 weight percent silicon particles, about 10 weight percent finely-divided copper, and about 0.1 weight percent zinc.

11. A process for the production of triethoxysilane which comprises passing a mixture of hydrogen gas and ethanol vapor through a fluidized bed of silicon particles at about 280° C. and with a degree of fluidization between about 5 and about 20, said fluidized bed consisting essentially of about 90 weight percent silicon particles, about 10 weight percent finely-divided copper, and about 0.1 weight percent zinc.

References Cited in the file of this patent

UNITED STATES PATENTS

| | | |
|---|---|---|
| 2,389,931 | Reed et al. | Nov. 27, 1945 |
| 2,464,033 | Gilliam | Mar. 8, 1949 |

OTHER REFERENCES

Rochow: Jour. Am. Chem. Soc., vol. 70 (1948), pp. 2170–1.

UNITED STATES PATENT OFFICE
CERTIFICATE OF CORRECTION

Patent No. 3,072,700                January 8, 1963

Nicolaas P. M. de Wit

It is hereby certified that error appears in the above numbered patent requiring correction and that the said Letters Patent should read as corrected below.

Column 1, line 21, for the left-hand portion of the formula reading, "$C_rH_{2r\div1}$" read -- $C_rH_{2r+1}$ --; line 41, for "$SiHcl_3$" read -- $SiHCl_3$ --; column 3, line 4, for "subtantially" read -- substantially --; column 5, line 62, for "differeing" read -- differing --; column 6, line 5, for the left-hand portion of the formula reading, "$CrH_{2r+1}$" read -- $C_rH_{2r+1}$ --.

Signed and sealed this 20th day of August 1963.

(SEAL)
Attest:

ERNEST W. SWIDER                DAVID L. LADD
Attesting Officer                Commissioner of Patents